United States Patent
Radovic et al.

(10) Patent No.: US 8,732,430 B2
(45) Date of Patent: May 20, 2014

(54) METHOD AND APPARATUS FOR USING UNUSED BITS IN A MEMORY POINTER

(75) Inventors: Zoran Radovic, San Jose, CA (US); Graham Ricketson Murphy, Sunnyvale, CA (US); Paul J. Jordan, Austin, TX (US); John G. Johnson, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 234 days.

(21) Appl. No.: 13/069,337

(22) Filed: Mar. 22, 2011

(65) Prior Publication Data

US 2012/0246437 A1 Sep. 27, 2012

(51) Int. Cl.
*G06F 12/10* (2006.01)
*G06F 12/02* (2006.01)

(52) U.S. Cl.
CPC ................... *G06F 12/10* (2013.01); *G06F 12/02* (2013.01)
USPC ............................ 711/170; 711/206; 711/200

(58) Field of Classification Search
CPC ......... H04L 49/90; H04L 29/06; G06F 21/78; G06F 12/10; G06F 12/02
USPC ..................................................... 711/170, 6
See application file for complete search history.

(56) References Cited

U.S. PATENT DOCUMENTS

| | | | |
|---|---|---|---|
| 6,686,920 B1 * | 2/2004 | Peck et al. | 345/557 |
| 7,533,221 B1 * | 5/2009 | Doherty et al. | 711/147 |
| 8,051,267 B1 * | 11/2011 | Chase | 711/170 |
| 8,136,158 B1 * | 3/2012 | Sehr et al. | 726/22 |
| 2002/0194184 A1 * | 12/2002 | Baskins et al. | 707/100 |
| 2002/0194191 A1 * | 12/2002 | Sexton et al. | 707/102 |
| 2008/0140968 A1 * | 6/2008 | Doshi et al. | 711/163 |
| 2009/0271763 A1 * | 10/2009 | Varma et al. | 717/114 |

* cited by examiner

*Primary Examiner* — April Y Blair
*Assistant Examiner* — Kenneth Tsang
(74) *Attorney, Agent, or Firm* — Park, Vaughan, Fleming & Dowler LLP; Mark Spiller

(57) ABSTRACT

The disclosed embodiments provide a system that uses unused bits in a memory pointer. During operation, the system determines a set of address bits in a address space that will not be needed for addressing purposes during program operation. Subsequently, the system stores data associated with the memory pointer in this set of address bits. The system masks this set of address bits when using the memory pointer to access the memory address associated with the memory pointer. Storing additional data in unused pointer bits can reduce the number of memory accesses for a program and improve program performance and/or reliability.

20 Claims, 4 Drawing Sheets

METHOD AND APPARATUS FOR USING UNUSED BITS IN A MEMORY POINTER

BACKGROUND

1. Field of the Invention

This disclosure generally relates to techniques for making use of unused bits in memory pointers. More specifically, this disclosure relates to techniques for storing data in unused bits of memory pointers, and masking out this stored data when using such memory pointers to access memory addresses.

2. Related Art

Advances in technology have led to improved processor capabilities, increased memory sizes, and increasingly sophisticated applications. For instance, while processors that used 32-bit memory addresses to directly access up to 4 GB of memory were recently common, they are now being displaced by 64-bit processors that include direct support for 64-bit data types and addresses.

However, different processors may manage 64-bit pointers in a range of ways, some of which make the high-order bits of the pointers nearly useless. For instance, some systems ignore the higher 32 bits of 64-bit memory pointers, or require an upper slice of such pointers to be either all ones or all zeros. In such approaches, such unused high-order bytes waste bandwidth and heap storage space. Alternative approaches seek to compress pointers down to 32 bits, thereby potentially reducing waste, but limiting the system to several billion pointers and/or requiring decompression operations.

Hence, what is needed are techniques for using 64-bit pointers without the above-described problems.

SUMMARY

The disclosed embodiments provide a system that uses unused bits in a memory pointer. During operation, the system determines a set of address bits in an address space that will not be needed for addressing purposes during program operation. Subsequently, the system stores data associated with the memory pointer in this set of address bits. The system masks this set of address bits when using the memory pointer to access the memory address associated with the memory pointer. Storing additional data in unused pointer bits in this way can reduce the number of memory accesses for a program and can thereby improve program performance and/or reliability.

In some embodiments, the stored data is associated with an object that a virtual memory pointer points to, and storing object data in unused pointer bits can reduce the number of memory accesses needed to access object data. For instance, storing object data needed for a garbage collection operation in unused pointer bits can reduce the number of memory accesses needed for garbage collection, thereby speeding up the garbage collection operation.

In some embodiments, a processor register is configured to track the number of bits being used to store other data. The system can check this processor register when determining which bits in the memory pointer need to be masked.

In some embodiments, data stored in unused bits of a virtual memory pointer is masked before the virtual memory pointer is received by a processor TLB for translation into a physical memory address.

In some embodiments, determining which bits of a memory pointer can be used to store other data can involve: choosing a set of address bits to be used during a compilation operation; receiving a specification for a set of address bits to be used from a program binary being loaded; and/or dynamically determining how many address bits should be used based on an available processor, a physical memory size, and/or predicted application addressing needs.

In some embodiments, storing data in unused pointer bits may involve: configuring a runtime environment to store and/or access data in unused pointer bits; configuring a compiler to generate instructions that store and/or access data in unused pointer bits; configuring a heap manager to store and/or access data in unused pointer bits; and configuring a program load mechanism in an operating system to facilitate storing and/or accessing data in unused pointer bits.

In some embodiments, the stored data includes origination data and/or memory version information for the memory pointer. Such data can be used to determine the cause of bugs that are associated with the memory pointer and to ensure that a memory region associated with the memory pointer is valid.

DETAILED DESCRIPTION

Figure 1:
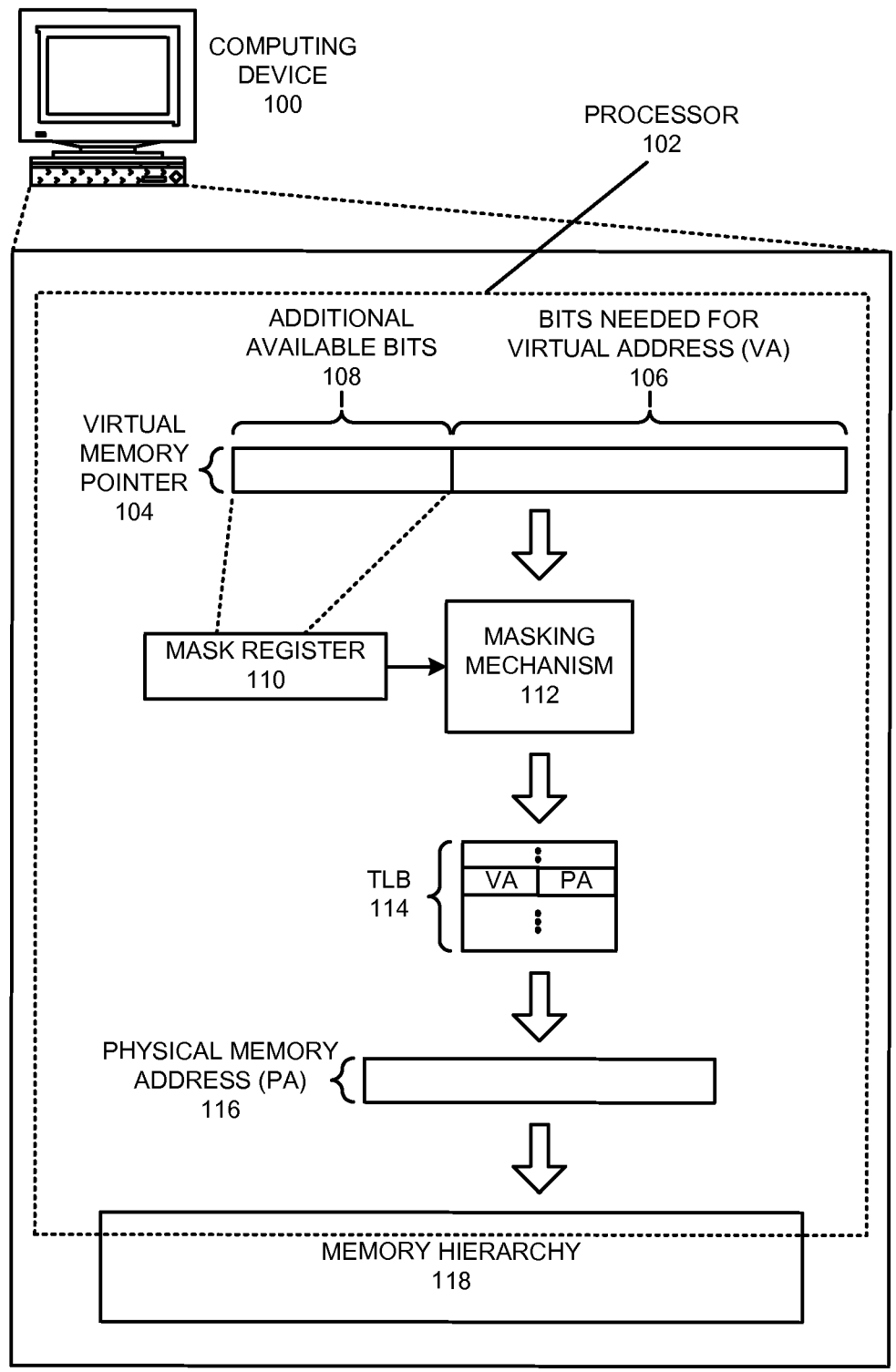
FIG. 1 illustrates an exemplary computing device in which unused bits of a virtual memory pointer can be used for other purposes in accordance with an embodiment.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

Issues for 64-Bit Memory Pointers 64-bit processors are becoming increasingly common. However, while such processors can use 64-bit memory addresses to potentially access exabytes of memory, current physical memory sizes (and even lower levels of the storage hierarchy) typically span far fewer than 64 bits. For instance, some systems that were pushing the limits of the 32-bit (4 gigabyte) memory boundary may only need a few additional bits to address the available physical memory. Virtual memory techniques may also increase the number of bits needed for memory pointers by several bits, but generally, in 64-bit systems, the high-order bits of 64-bit pointers are mostly unused.

Some processors may be configured to ignore the higher 32 bits of 64-bit memory pointers, or require an upper slice of such pointers to be either all ones or all zeros. Such unused bits are typically still stored along with the pointers, and hence waste bandwidth and heap storage. Some other approaches seek to avoid such waste by compressing pointers down to 32 bits. However, these approaches limit the number of objects that can be addressed, or sometimes require decompression operations that involve additional complexity and/or overhead.

Embodiments of the present invention facilitate using unused bits in memory pointers for other purposes, thereby reducing the needed memory bandwidth and storage waste. For instance, some embodiments enable a flexible pointer structure that allows data to be encoded and cached in each memory pointer, thereby potentially reducing an application's footprint and number of memory accesses. For example, a system may store object metadata in the object's pointer, thereby freeing space in the object header and allowing this data to be directly accessed from the pointer (e.g., without a memory access). The ability to access object fields without performing a memory access can improve performance (e.g., by reducing the number of memory accesses needed per object during a garbage collection operation).

Re-Purposing Unused High-Order Bits of 64-Bit Memory Pointers

FIG. 1 illustrates an exemplary computing device 100 in which unused bits of a virtual memory pointer (sometimes also referred to simply as a pointer) can be used for other purposes. A program instruction (not shown) executing on processor 102 of computing device 100 accesses a virtual memory pointer 104. Virtual memory pointer 104 includes a set of bits that are needed to indicate the desired virtual memory address 106, as well as additional available bits 108 that are not strictly needed to identify the virtual address. These additional available bits 108 can be used to store other data, thereby improving program performance and/or reliability. A mask register 110 tracks the set of bits in virtual memory pointer 104 that are being used to store such data.

During operation, processor 102 may need to reference virtual memory pointer 104 to access data at the associated virtual address. Processor 102 uses mask register 110 and masking mechanism 112 to mask out the portions of virtual memory pointer 104 that have been used to store other data, so that only the bits needed for the virtual memory address 106 are sent on to the translation lookaside buffer (TLB 114) to be translated into a physical memory address 116. Physical memory address 116 is then passed on to the memory hierarchy 118 (portions of which may be internal to and/or external to processor 102) for a cache and/or memory access. Note that by architecturally "nullifying" particular address bits, the masking hardware ensures that the additional data stored in virtual memory pointer 104 is never seen by TLB 114 or memory hierarchy 118. Note also that only virtual addresses need to be masked; masking is not applied to and does not affect physical addresses.

Figure 2:
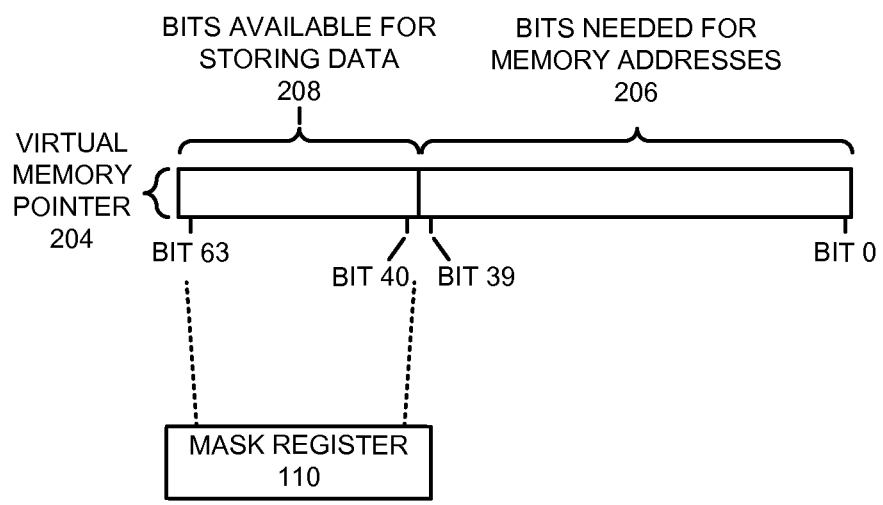
FIG. 2 illustrates an exemplary virtual memory pointer in a 64-bit processor architecture that only implements 40 bits in accordance with an embodiment.

FIG. 2 illustrates an exemplary virtual memory pointer 204 in a 64-bit processor architecture that only implements (e.g., accesses memory addresses using) 40 bits, thereby leaving 24 bits to store data. More specifically, in this architecture, pointer bits 0 to 39 are used for memory addressing 206, and bits 40 to 63 can be used for storing data 208. Mask register 110 tracks which of bits 40 to 63 store data, so that these bit positions can be masked to generate a valid data address during an object reference. Generally, having more bits available can lead to more benefits, especially as architectures move to larger address spaces (e.g., 128 bits, etc.). Some specific examples of such benefits are described in more detail below.

Figure 3:
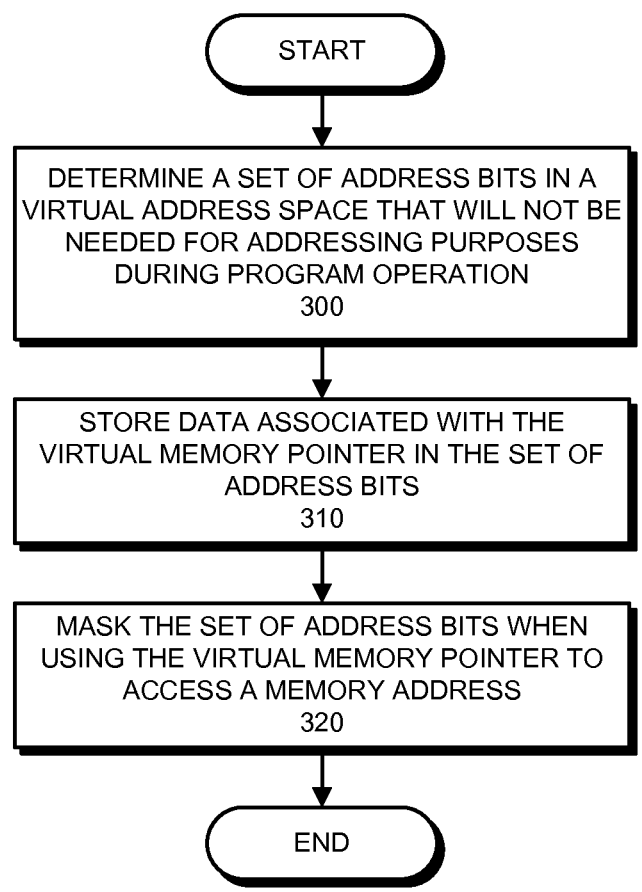
FIG. 3 presents a flow chart that illustrates the process of using unused bits in a virtual memory pointer in accordance with an embodiment.

FIG. 3 presents a flow chart that illustrates the process of using unused bits in a virtual memory pointer. During operation, the system determines a set of address bits in a virtual address space that will not be needed for addressing purposes during program operation (operation 300). Subsequently, the system stores data associated with the virtual memory pointer in these address bits (operation 310). The system masks this set of address bits when using the virtual memory pointer to access the memory address associated with the virtual memory pointer (operation 320). Storing additional data in unused pointer bits can reduce heap storage waste and reduce the number of memory accesses for a program.

Note that while the examples in FIGS. 1-3 illustrate using unused bits of a virtual memory pointer for other purposes, similar techniques can also be applied to physical memory pointers. For instance, operating systems, hypervisors (e.g., virtual machine monitoring applications), or other applications that directly interact with physical addresses may also use such techniques to store data in unused pointer bits of physical memory pointers. Generally, such techniques can be used anywhere where the addressing registers are wider than needed for a physically addressable memory (e.g., if the addressing registers are 64 bits wide, and the physically addressable memory is only 48 bits wide).

Tracking Masking Information

Note that, while the above figures illustrate a hardware mask register that tracks the number of pointer bits being used to store data, such tracking can be implemented using a range of techniques. For instance, such tracking may be performed using a range of software and/or hardware mechanisms. If such masking operations are expected to be frequent, the system may include one or more processor state registers that facilitate pointer masking operations. For instance, the system may use such registers both to indicate whether masking is currently enabled, and if so, which pointer bits are currently storing data and need to be masked when the pointer is referenced.

In some embodiments, a hardware mask register holds a bit mask that can be applied to a pointer. When no data is stored in high-order bits, this mask will usually be all zeros (indicating that all address bits are always significant); when data is stored, the mask is configured to mask out the data-carrying bits (e.g., any non-zero bits in the mask mark bit positions which will be ignored by an address bus).

In alternative embodiments, rather than maintain a 32- or 64-bit mask register, a system may include an index register that identifies the first pointer bit (or byte) that should be masked. For instance, in a 64-bit architecture that specifies bit 63 as the top virtual address, this mask index register may specify a starting bit, and all of the bits between this starting bit and the top virtual address bit are used to store data. For example, a 6-bit index register could be used to indicate any of the bits in a 64-bit architecture as the starting bit. Alternatively, a 7-bit index register may be used instead to allow bit ranges for both 64-bit architectures as well as future 128-bit architectures.

Note that different processor implementations may choose to allow different numbers of bits to be used for masking. For instance, some processor architectures may allow any pointer bits to be masked, while others may allow only a subset and/or define a "minimum starting bit." For example, a minimum starting bit of 32 might prohibit masking of the lower 32 address bits, and an attempt to mask bits below the minimum might be ignored, trapped, or "saturated" to 32, depending on the implementation.

In some embodiments, depending on the underlying architecture, the system may need to sign-extend masked pointer bits to ensure the correctness of the resulting memory address. For instance, the system may need to sign-extend a virtual address from the highest unmasked bit before comparing the masked address with entries in a TLB.

In some embodiments, a range of different software and hardware entities may need to access the masking mechanisms to ensure that a masked and/or unmasked pointer is correctly accessed. For instance, during a system call, an operating system may need to check to determine whether masking is enabled and whether a given pointer includes stored data that needs to be masked, and then may need to initiate a masking operation prior to using the pointer. Hence, knowledge of and support for masking capabilities may need to be integrated into a range of hardware and software mechanisms (e.g., into an operating system, a program loader, a compiler, a virtual machine runtime environment, etc.). Note that such entities may also have a range of access privileges. For instance, configuring a mask index register may be a privileged operation (e.g., performed by a virtual machine runtime environment at startup, while heaps are being defined), but non-privileged code may be allowed to access masking information on a read-only basis.

Note also that in some embodiments other existing infrastructure may also need to be adjusted to facilitate storing additional data in unused bits of memory pointers. For instance, some processor architectures perform memory corruption checks (also referred to as "memory hole checks") that generate exceptions when unusual memory addresses are detected. For example, a processor that only implements 42 bits may be configured to throw a memory address range exception (and trap to the operating system) whenever a pointer address that uses more than 42 bits is encountered. Such checks would need to be adjusted to first perform any needed masking, thereby ensuring that data stored in high-order bits of a virtual memory pointer is ignored and does not trigger such an exception.

In some embodiments, masking mechanisms may be configured to operate for a range of software granularities. For instance, address masks may be set on a per-application, a per-process, and/or a per-software thread (e.g., individually for each hardware strand) basis. Note that masking configuration data may need to be stored and loaded during process and/or thread context switches.

In some embodiments, the system may use a range of techniques to determine how many bits of a memory pointer can or will be used to store other data. For instance, relevant hints may be passed to a compiler using compiler options, thereby making the compiler aware of the capability and allowing the compiler to perform some optimizations. However, hard-coding a specific number of bits to be used in a compiled binary may be undesirable, because such hard-coding may make distributing non-processor-specific program binaries more difficult. Hence, some embodiments may facilitate dynamically deciding how many pointer bits should be used to store data. For example, a loader may be configured to determine how many bits are available when loading a program to be executed (e.g., based on a processor identifier, the available memory, the predicted virtual address space that may be needed by an application, etc.), and set up the address space and runtime environment appropriately. Another option is to provide a system call that can be invoked by applications to enable such storage capabilities and pointer masking. As mentioned above, different applications and/or runtime environments that are executing simultaneously may be configured to store different data (and different amounts of data), and use different levels of masking.

Application needs may change during execution, and hence the number of pointer bits available for storing data may decrease (or increase) during operation. Changing the set of bits that are being masked and updating the data stored in all existing pointers may involve substantial overhead and complexity, and hence some embodiments may not allow changing such mappings after a process has been configured and started execution. In such scenarios, changing the set of masked bits may involve exiting and re-starting an application. Alternative embodiments may allow these mappings to be changed during execution. For instance, some embodiments may allow masking to be disabled and then re-enabled with a different bit range. For example, if the data stored in pointer bits is cached object field data, such an operation may effectively flush cached data (e.g., by walking through all pointers and clearing out all data stored in pointers) and then re-load some or all of the data in the new set of pointer bits. Note that this may be an intrusive operation (e.g., somewhat similar to, or perhaps operating in conjunction with, garbage collection).

Benefits of Storing Additional Data in Unused Pointer Bits

As mentioned previously, storing object data in unused pointer bits can lead to improvements in program performance and/or reliability. For example, program performance in object-based languages and environments (e.g., in a Java™ Virtual Machine (JVM™); Java and JVM are trademarks of the Oracle Corporation) often depends sensitively on memory bandwidth (including cache size) and the average object size. Reducing object size by moving object fields out of objects (and/or object headers) and into unused pointer bits benefits performance both by decreasing the volume of data memory accesses as well as by reducing object size. Depending on the application and the mix of object sizes in the heap, such techniques may substantially improve performance.

Some embodiments facilitate improving the performance of garbage collection operations by storing object metadata in unused virtual memory pointer bits. Periodic garbage collection operations typically scan through many (or all) allocated objects to determine the set of objects that are still "live" and to reclaim the space allocated to objects that are no longer needed. During such scans, the system typically needs to access a number of object fields, for instance to determine whether an object has been statically or dynamically allocated and whether an object has been "pinned" (e.g., identified as an object that should be present for the lifetime of the application and thus should not be garbage collected). Normally such accesses might involve multiple memory lookups for object fields; caching object metadata in unused pointer bits can remove such dependent loads from the garbage collection operation, thereby speeding up garbage collection and saving memory bandwidth.

Using pointer-based languages which allow a programmer to allocate and manage memory may lead to a large number of pointer-based bugs (e.g., errors, flaws, failures and/or faults that cause a computer program to produce incorrect, corrupted, or unexpected results). Some embodiments facilitate improving software reliability by using unused pointer bits to implement "pointer coloring" and/or memory corruption detection. For instance, pointer coloring techniques can use a set of unused bits in a pointer to indicate the origination point of the pointer in the program source code. When the system detects that a dereferenced pointer is attempting to access an invalid address, the information stored in the (otherwise unused) high-order pointer bits can be used to pinpoint potential locations of the originating error in the program source code. Memory corruption detection techniques may re-purpose unused pointer bits to tag memory buffers with version numbers. The system can double-check such version numbers during memory accesses to confirm that the memory buffer being accessed via a pointer is still valid and that the access is still allowed.

Note that multiple techniques may simultaneously use different sets of unused pointer bits. For example, data for pointer coloring and memory corruption detection techniques as well as object field data may all be stored simultaneously within the unused bits of a virtual memory pointer. Note also that a range of techniques and/or entities may be used to load the desired data into the target pointer bits. For instance, a runtime environment, heap manager, and/or compiler may be configured to load the desired data into pointers (e.g., for objects, at the time that a new object and its pointer are created).

In summary, embodiments of the present invention facilitate using unused bits in memory pointers for other purposes. Storing data in unused pointer bits can free space in object headers and reduce the number of memory accesses performed by a program, thereby improving program performance. For instance, such techniques can be used to speed up garbage collection operations as well as to enable pointer coloring and memory corruption detection techniques that can be used to improve program reliability.

Computing Environment

Figure 4:
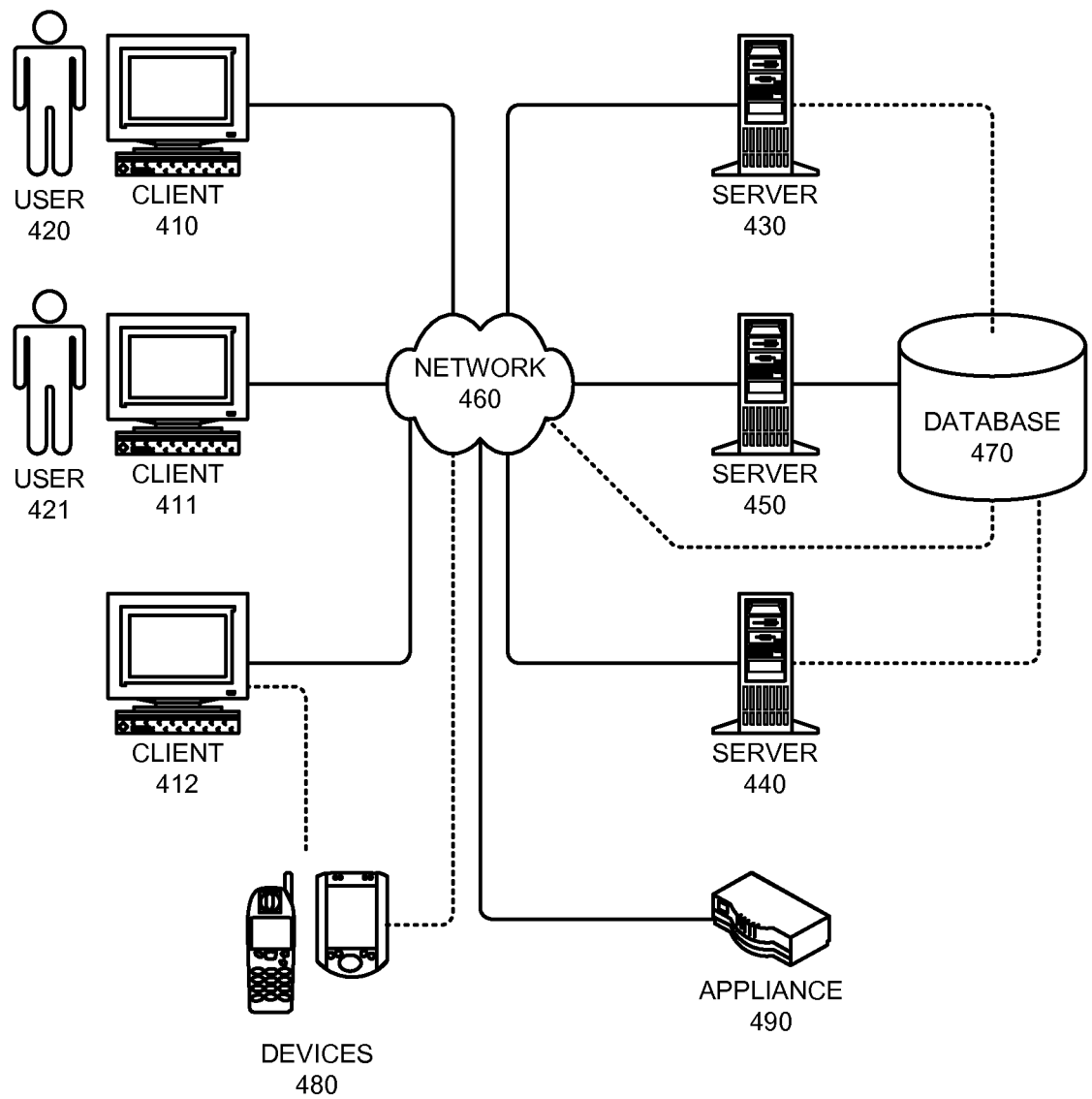
FIG. 4 illustrates a computing environment in accordance with an embodiment.

In some embodiments of the present invention, techniques for using unused bits in a memory pointer can be incorporated into a wide range of computing devices in a computing environment. For example, FIG. 4 illustrates a computing environment 400 in accordance with an embodiment of the present invention. Computing environment 400 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 4, computing environment 400 includes clients 410-412, users 420 and 421, servers 430-450, network 460, database 470, devices 480, and appliance 490.

Clients 410-412 can include any node on a network that includes computational capability and includes a mechanism for communicating across the network. Additionally, clients 410-412 may comprise a tier in an n-tier application architecture, wherein clients 410-412 perform as servers (servicing requests from lower tiers or users), and wherein clients 410-412 perform as clients (forwarding the requests to a higher tier).

Similarly, servers 430-450 can generally include any node on a network including a mechanism for servicing requests from a client for computational and/or data storage resources. Servers 430-450 can participate in an advanced computing cluster, or can act as stand-alone servers. For instance, computing environment 400 can include a large number of compute nodes that are organized into a computing cluster and/or server farm. In one embodiment of the present invention, server 440 is an online "hot spare" of server 450.

Users 420 and 421 can include: an individual; a group of individuals; an organization; a group of organizations; a computing system; a group of computing systems; or any other entity that can interact with computing environment 400.

Network 460 can include any type of wired or wireless communication channel capable of coupling together computing nodes. This includes, but is not limited to, a local area network, a wide area network, or a combination of networks. In one embodiment of the present invention, network 460 includes the Internet. In some embodiments of the present invention, network 460 includes phone and cellular phone networks.

Database 470 can include any type of system for storing data in non-volatile storage. This includes, but is not limited to, systems based upon magnetic, optical, or magneto-optical storage devices, as well as storage devices based on flash memory and/or battery-backed up memory. Note that database 470 can be coupled: to a server (such as server 450), to a client, or directly to a network. In some embodiments of the present invention, database 470 is used to store information that may later be stored in unused bits of a memory pointer. Alternatively, other entities in computing environment 400 may also store such data (e.g., servers 430-450).

Devices 480 can include any type of electronic device that can be coupled to a client, such as client 412. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 480 can be coupled directly to network 460 and can function in the same manner as clients 410-412.

Appliance 490 can include any type of appliance that can be coupled to network 460. This includes, but is not limited to, routers, switches, load balancers, network accelerators, and specialty processors. Appliance 490 may act as a gateway, a proxy, or a translator between server 440 and network 460.

Note that different embodiments of the present invention may use different system configurations, and are not limited to the system configuration illustrated in computing environment 400. In general, any device that supports browser applications and the downloading of signed data sets may incorporate elements of the present invention.

Previously described FIG. 1 illustrates masking mechanisms that can mask unused address bits that are used to store data. In some embodiments of the present invention, some or all aspects of mask register 110 and/or masking mechanism 112 can be implemented as dedicated hardware modules in processor 102. For example, processor 102 can include one or more specialized circuits for performing the operations of the mechanisms. Alternatively, some or all of the operations of mask register 110 and/or masking mechanism 112 may be performed using general-purpose circuits in processor 102 that are configured using processor instructions.

Although FIG. 1 illustrates mask register 110 and masking mechanism 112 as being included in processor 102, in alternative embodiments some or all of these mechanisms can be either external or internal to processor 102. For instance, these mechanisms may be incorporated into hardware modules external to processor 102. These hardware modules can include, but are not limited to, processor chips, application-specific integrated circuit (ASIC) chips, field-programmable gate arrays (FPGAs), memory chips, and other programmable-logic devices now known or later developed.

In these embodiments, when the external hardware modules are activated, the hardware modules perform the methods and processes included within the hardware modules. For example, in some embodiments of the present invention, the hardware module includes one or more dedicated circuits for performing the operations described below. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for using unused bits in a memory pointer, comprising:
   when loading a program to be executed, determining a set of address bits in the memory pointer that are not needed for addressing during program operation by using a program loader to:
      determine an amount of memory available to the program;
      predict an amount of virtual address space needed by the program;
      determine how many bits are available in the memory pointer based on the determined available memory and the predicted virtual address space
      set up an address space and runtime environment based on the bits available in the memory pointer;
   storing data associated with the memory pointer in the set of address bits, wherein the stored data comprises data associated with an object that the memory pointer points to; and
   masking the set of address bits when using the memory pointer to access a memory address;
   wherein accessing the stored data from the set of address bits facilitates reducing the number of memory accesses needed to access object data.

2. The computer-implemented method of claim 1,
   wherein the stored data comprises object data associated with a garbage collection operation; and
   wherein reducing the number of memory accesses for objects during garbage collection facilitates speeding up the garbage collection operation.

3. The computer-implemented method of claim 1,
   wherein the method further comprises using a processor register to track the number of bits in the set of address bits; and
   wherein masking the set of address bits involves checking the processor register to determine the address bits to be masked for the memory pointer.

4. The computer-implemented method of claim 1, wherein the set of address bits is masked before the memory pointer is received by a processor TLB for translation to a physical memory address.

5. The computer-implemented method of claim 1, wherein determining the set of address bits that are not needed for addressing involves one or more of the following:
   specifying the set of address bits during a compilation operation;
   receiving a specification for the set of address bits from a program binary being loaded; and
   dynamically determining the set of address bits based on at least one of a processor identifier, a physical memory size, and predicted application addressing needs.

6. The computer-implemented method of claim 1, wherein storing data associated with the memory pointer in the set of address bits further involves one or more of the following:
   using a runtime environment to store and access data in the set of address bits;
   using a compiler to generate instructions that store and access data in the set of address bits;
   using a heap manager to store and access data in the set of address bits; and
   using a program load mechanism in an operating system to facilitate storing and accessing data in the set of address bits.

7. The computer-implemented method of claim 1,
   wherein the stored data comprises origination data associated with the memory pointer; and
   wherein storing origination data for the memory pointer facilitates determining the cause of bugs associated with the memory pointer.

8. The computer-implemented method of claim 1,
   wherein the stored data comprises memory version information associated with the memory pointer; and
   wherein storing memory version information for the memory pointer facilitates ensuring that a memory region associated with the memory pointer is valid.

9. A non-transitory computer-readable storage medium storing instructions that when executed by a computer cause the computer to perform a method for using unused bits in a memory pointer, the method comprising:
   when loading a program to be executed, determining a set of address bits in the memory pointer that are not needed for addressing during program operation by using a program loader to:
      determine an amount of memory available to the program;
      predict an amount of virtual address space needed by the program;
      set up an address space and runtime environment for the program based on the determined available memory and the predicted virtual address space;
   storing data associated with the memory pointer in the set of address bits, wherein the stored data comprises data associated with an object that the memory pointer points to; and
   masking the set of address bits when using the memory pointer to access a memory address;
   wherein accessing the stored data from the set of address bits facilitates reducing the number of memory accesses needed to access object data.

10. The non-transitory computer-readable storage medium of claim 9, wherein the stored data comprises object data associated with a garbage collection operation; and wherein reducing the number of memory accesses for objects during garbage collection facilitates speeding up the garbage collection operation.

11. The non-transitory computer-readable storage medium of claim 9, wherein the method further comprises using a processor register to track the number of bits in the set of address bits; and wherein masking the set of address bits involves checking the processor register to determine the address bits to be masked for the memory pointer.

12. The non-transitory computer-readable storage medium of claim 9, wherein the set of address bits is masked before the memory pointer is received by a processor TLB for translation to a physical memory address.

13. The non-transitory computer-readable storage medium of claim 9, wherein determining the set of address bits that are not needed for addressing involves one or more of the following:

specifying the set of address bits during a compilation operation;

receiving a specification for the set of address bits from a program binary being loaded; and dynamically determining the set of address bits based on at least one of a processor identifier, a physical memory size, and predicted application addressing needs.

14. The non-transitory computer-readable storage medium of claim 9, wherein storing data associated with the memory pointer in the set of address bits further involves one or more of the following:

using a runtime environment to store and access data in the set of address bits;

using a compiler to generate instructions that store and access data in the set of address bits;

using a heap manager to store and access data in the set of address bits; and using a program load mechanism in an operating system to facilitate storing and accessing data in the set of address bits.

15. The non-transitory computer-readable storage medium of claim 9, wherein the stored data comprises origination data associated with the memory pointer; and wherein storing origination data for the memory pointer facilitates determining the cause of bugs associated with the memory pointer.

16. The non-transitory computer-readable storage medium of claim 9, wherein the stored data comprises memory version information associated with the memory pointer; and wherein storing memory version information for the memory pointer facilitates ensuring that a memory region associated with the memory pointer is valid.

17. A computing device configured to use unused bits in a memory pointer, comprising:

a processor;

a memory;

a determining mechanism configured to, when loading a program to be executed, determine a set of address bits in the memory pointer that are not needed for addressing during program operation by using a program loader to:

determine an amount of memory available to the program;

predict an amount of virtual address space needed by the program;

set up an address space and runtime environment based on the determined available memory and the predicted virtual address space;

a storage mechanism configured to store data associated with the memory pointer in the set of address bits, wherein the stored data comprises data associated with an object that the memory pointer points to; and a masking mechanism configured to mask the set of address bits when using the memory pointer to access an address in the memory;

wherein accessing the stored data from the set of address bits facilitates reducing the number of memory accesses needed to access object data.

18. The computing device of claim 17, wherein the computing device further comprises a register which tracks the number of bits in the set of address bits; and wherein masking the set of address bits involves checking the register to determine the address bits to be masked for the memory pointer.

19. The computing device of claim 17, wherein the set of address bits is masked before the memory pointer is received by a processor TLB for translation to a physical memory address.

20. The computing device of claim 17, wherein determining the set of address bits that are not needed for addressing involves one or more of the following:

specifying the set of address bits during a compilation operation;

receiving a specification for the set of address bits from a program binary being loaded; and dynamically determining the set of address bits based on at least one of a characteristic of the processor, a physical memory size available to the processor, and predicted application addressing needs.

* * * * *